Figure 13:
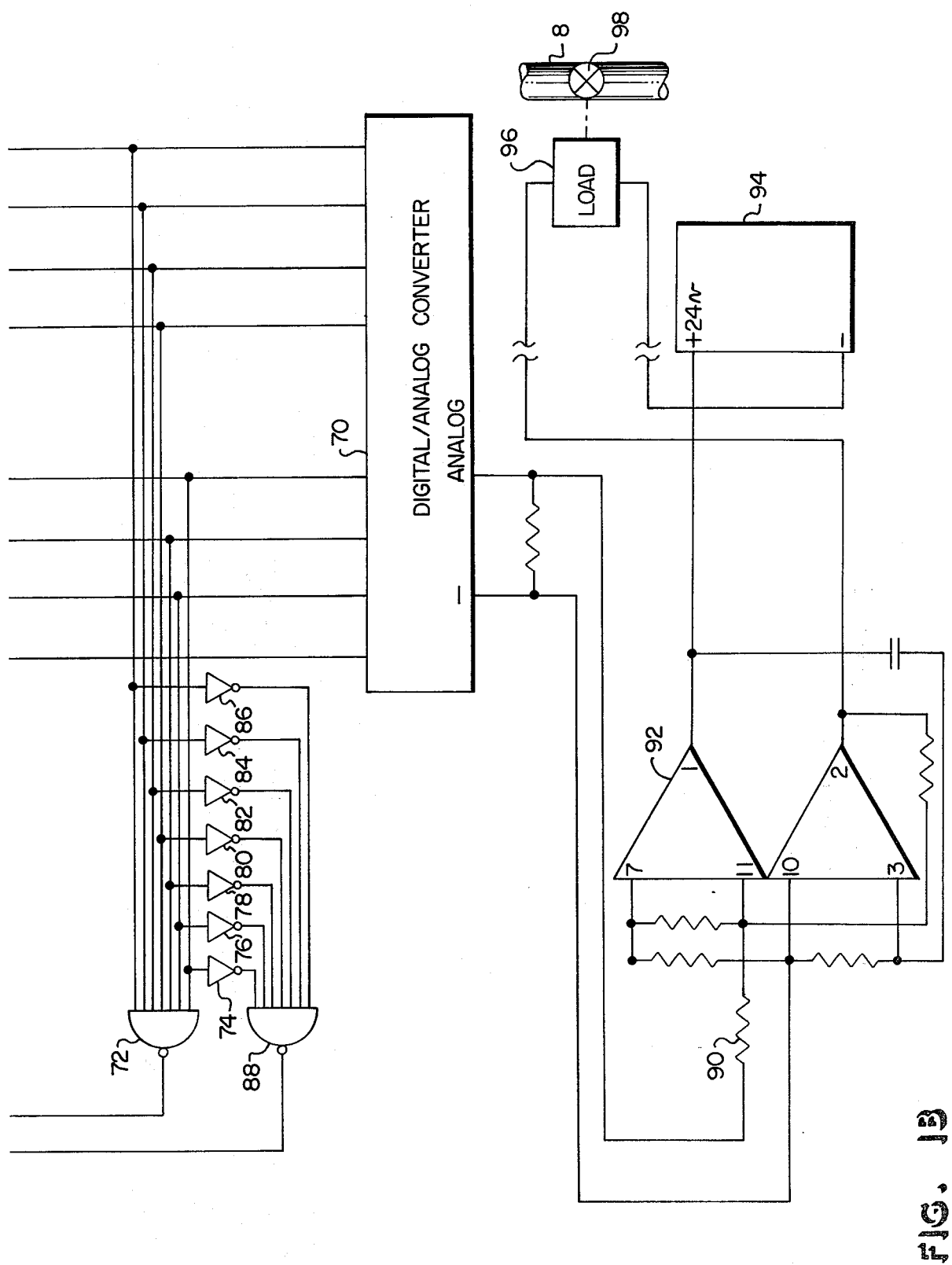

United States Patent [19]

Mayer

[11] 4,134,423
[45] Jan. 16, 1979

[54] FLOWRATE CONTROL MEANS

[75] Inventor: Robert Mayer, Ardmore, Pa.

[73] Assignee: Suntech, Inc., St. Davids, Pa.

[21] Appl. No.: 829,692

[22] Filed: Sep. 1, 1977

[51] Int. Cl.² .............................................. G05D 7/06
[52] U.S. Cl. .................................. 137/486; 137/487.5
[58] Field of Search ............................ 137/486, 487.5; 318/207 R, 601; 307/232

[56] References Cited

U.S. PATENT DOCUMENTS

| | | | |
|---|---|---|---|
| 3,174,504 | 3/1965 | Rosenbrook | 137/486 |
| 3,580,499 | 5/1971 | Bauer | 137/487.5 X |
| 3,997,826 | 12/1976 | Mayer | 318/601 X |

OTHER PUBLICATIONS

I.B.M. Technical Disclosure Bulletin; vol. 7, No. 11, Pulse Counter Flow Controller; R. J. Masterson, Apr. 1965.

*Primary Examiner*—Alan Cohan

*Attorney, Agent, or Firm*—J. Edward Hess; Donald R. Johnson; James H. Phillips

[57] ABSTRACT

In order to obtain very close control of the flowrate of a fluid through a conduit against a predetermined desired flowrate, a pulse generator is employed to produce pulses at a frequency representing the desired flowrate, and a flowmeter issues similar pulses representing the actual flowrate. First and second difference pulse streams are digitally derived to represent the difference by which the actual flowrate either exceeds or falls short of the desired flowrate, and these difference pulse streams are applied, respectively, to count down and count up inputs to an up/down counter. The instantaneous count held within the up/down counter is translated to an analog signal by a digital-to-analog converter, and the analog signal is applied to the input of a two-wire transmitter. The two-wire transmitter drives a valve-actuating motor, such as a d-c torquemotor, to correct the valve position as necessary to obtain and maintain the desired flowrate.

8 Claims, 2 Drawing Figures

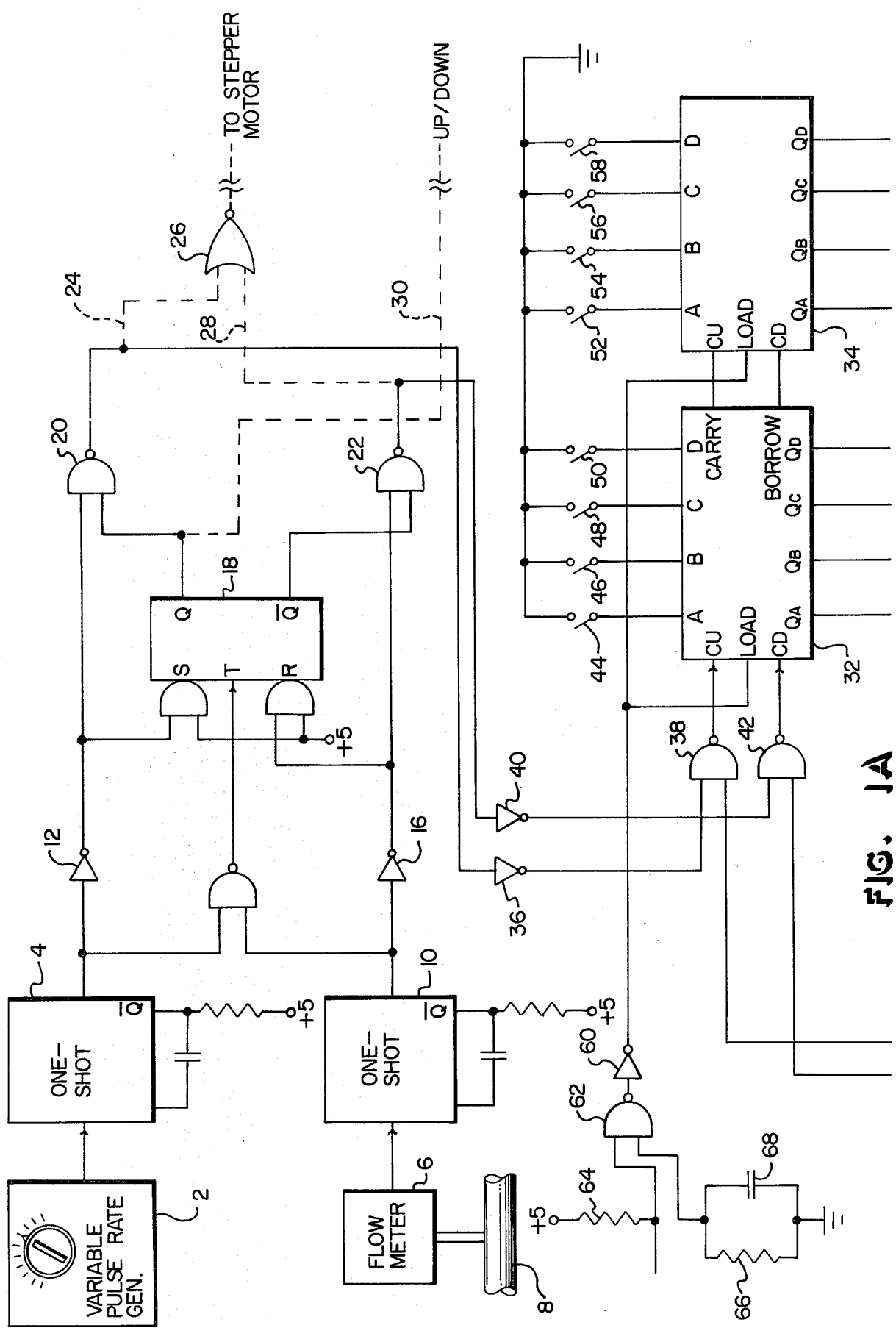

FLOWRATE CONTROL MEANS

This invention relates to the fluid flow control arts and, more particularly, to means for obtaining and closely maintaining a predetermined flowrate of a fluid through a conduit.

The need for means to establish and maintain the flowrate of a fluid through a conduit at a predetermined flowrate is evident in many environments and applications. One such application may be found in liquid stream type blending apparatus in which the flowrate of each blending component must be maintained to a considerable degree of precision in order to achieve the desired blend. For an example of such blending apparatus, one may refer to U.S. Pat. No. 3,860,030; entitled "Plural-Header Blending System", invented by Robert Mayer and assigned to Sun Oil Company, Philadelphia, Pa.

In a blending system of the aforementioned type, each so-called "stream module" includes a motor drive circuit for driving a valve opeating motor which actuates a control valve (throttle valve) in the flow loop corresponding to that particular stream module. Prior art motor drive apparatus for such an application is disclosed in U.S. Pat. Nos. 3,970,942 and 3,997,826; for each of which the inventor is Robert Mayer and the assignee is Sun Oil Company of Pennsylvania. As shown in these references, each motor drive circuit compares the pulse repetition rates of two trains of pulses, one of which may be termed the "demand" pulses and the other of which may be termed the "actual" pulses. The "demand" pulse train is derived from the output of a pulse generator which by operating at some preestablished frequency, issues a pulse train representing the desired flowrate. The "actual" pulse train is derived from a flowmeter which is physically situated on the downstream side of the flowrate control valve. The flowmeter senses the flow of fluid through the valve and responds thereto by generating pulses at a rate proportional to the "actual" rate of fluid flow through the valve. After certain digital processing to compare the pulse rates of the two trains of pulses, a valve operator motor drive circuit operates to energize a stepping motor to increment the control valve open or closed, depending upon which the two pulse rates is the higher, the energization of the stepping motor continuing until the two pulse rates are the same.

This prior art apparatus has performed well in practice. Nonetheless, those skilled in the art will appreciate that it would be highly desirable to provide flowrate control means with the ability to provide finer, and essentiallly stepless, control over the flowrate of a fluid through a conduit, which result is achieved simply and economically.

It is therefore a broad object of this invention to provide improved means for controlling the rate of flow of a fluid through a conduit.

It is a more particular object of this invention to provide such means by which the flowrate of the fluid is adjusted and maintained at a predetermined flowrate.

It is another object of this invention to provide such means which is essentially continuous and stepless in operation.

It is a more specific object of this invention to provide such means by which pulses from a pulse generator representing a desired flowrate and pulses from a flowmeter representing actual flowrate are processed to obtain an analog signal representative thereof, which analog signal is employed to set the position of a continuously adjustable flowrate control valve.

In a still more specific aspect, it is an object of this invention to provide such means by which the difference in rates of the pulse streams is digitally processed and employed to adjust the count in an up/down counter, the output of which undergoes a digital-to-analog conversion to obtain an analog signal which may be employed to set the position of a flowrate control valve.

The subject matter of the invention is particularly pointed out and distinctly claimed in the concluding portion of the specification. The invention, however, both as to organization and method of operation, may best be understood by reference to the following description taken in connection with the accompanying drawing of which:

FIGS. 1A and 1B, taken together, constitute a partly schematic logic block diagram of a presently preferred embodiment of the invention.

Referring now to the single diagram comprising FIGS. 1A and 1B, a variable pulse rate generator 2 is adjusted to issue a stream of pulses at a pulse rate which corresponds to the desired flowrate of a fluid in a process. The leading edge of each pulse from the variable pulse rate generator 2 is applied to the trigger input if a first one-shot multivibrator 4. Similarly, a flowmeter 6 generates a pulse train having a pulse rate which is representative of the flowrate through a conduit 8 of the fluid whose flowrate is under system control. The pulse train issued by the flowmeter 6 is applied to the trigger input of a second one-shot multivibrator 10. The time constants of each of the one-shot multivibrators 4 and 10 is such that a relatively brief excursion from logic 1 to logic 0 is observed at the $\overline{Q}$ output from each in response to the presence of a pulse leading edge applied to the trigger input.

The $\overline{Q}$ output from the one-shot multivibrator 4 is applied to the input of an inverter 12 and also to one input leg of a NAND gate 14. Similarly, the $\overline{Q}$ output from the one-shot multivibrator 10 is applied to the input of a logic inverter 16 and to the other input leg of NAND gate 14. The output from the NAND gate 14 is applied to the trigger input of a JK flip-flop 18 which is connected as a set/reset triggered flip-flop. The inverters 12 and 16 drive, respectively, the set and reset inputs to the flip-flop 18. In addition, the inverter 12 drives one input leg of a NAND gate 20, and the inverter 16 drives one input leg of another NAND gate 22. Second inputs to the NAND gates 20 and 22 are driven, respectively, by the Q and $\overline{Q}$ outputs from the flip-flop 18.

The apparatus described to this point constitutes a major section of a known prior art system for bringing the flowrate, as observed by the flowmeter 6, into accord with the selected flowrate set by the pulse rate generator 2. For the purpose of comparison, the remainder of the prior art system will now be described. The output from the NAND gate 20 is applied, through line 24, to a first input to a NOR gate 26. Similarly, the output from the NAND gate 22 drives, through a line 28, a second input to NOR gate 26. Thus, it will be observed that the NOR gate 26 issues output pulses in response to pulses received from either the NAND gates 20 and 22. These output pulses are issued to conventional stepper motor drive circuitry (not shown) which controls a stepper motor (not shown) employed to adjust the position of a flow valve (not shown) in the fluid conduit 8 to regulate the rate of fluid flow there-through. In addition, the state of the Q output from the flip-flop 18 is coupled, through a line 30, to issue up-/down information to the stepper motor circuitry to determine the direction in which the stepper motor is to be pulsed to either increase or decrease the observed flowrate of the fluid through the conduit 8.

The operation of the apparatus described to this point is as follows. Assuming an initial exemplary condition in which neither of the one-shot multivibrators 4 and 10 have "recently" been pulses, each will be in the reset state with logic 1 being observed at the $\bar{Q}$ output of each. Therefore, the NAND gate 14 and the inverters 12 and 16 each issue a Q output. As a result, the flip-flop 18 maintains its previous state, and neither the NAND gates 20, 22 issue a logic level transition pulse which would be coupled through the NOR gate 26 to the stepper motor circuitry.

Consider now the condition in which the pulse rate generator 2 issues a pulse before the flowmeter 6. As a result, the one-shot 4 changes state while the one-shot 10 does not. The $\bar{Q}$ output from the one-shot 4 translates from logic 1 to logic 0, and this level is inverted through the inverter 12 to place a set pedestal onto the slip-flop 18. Alditionally, the output from the NAND gate 14 goes from a logic 0 to a logic 1 to trigger the flip-flop 18 which therefore assumes (or retains) the set state placing (or retaining) a logic 1 at its Q output to accordingly condition the NAND gate 20 and also to issue an "up" logic signal to the stepper motor control. The output from the inverter 12 applied to the other input of the NAND gate 20 therefore causes a logic 1 to logic 0 transition to appear at the output of the NAND gate 20, and this transition is inverted through the NOR gate 26 to provide a positive-going pulse to the stepper motor circuitry. The stepper motor therefore steps one position in the direction to slightly increase the fluid flowrate through the conduit 8.

Similarly, if the flowmeter 6 should issue a pulse prior to the pulse rate generator 2, the one-shot 10 will assume the set state while the one-shot 4 remains reset. The resulting trigger pulse from the NAND gate 14 will serve to reset the flip-flop 18. The logic 0 observed at the Q output of the flip-flop 18 is interpreted as a "down" control signal to the stepper motor control, and a negative-going pulse observed at the output of the NAND gate 22 is inverted through the NOR gate 26 to provide a drive pulse to the stepper motor circuitry. The stepper motor responds by translating one step in the "down" direction to decrease slightly the flowrate of the fluid through the conduit 8.

Thus, any substantial difference between the flowrate desired and that observed, such as may happen upon start-up or during a process change, is quickly corrected by a preponderance of pulses in the appropriate direction followed by the stepping back and forth one or two steps to maintain the flowrate of the fluid through the conduit 8 relatively constant.

As previously discussed, this prior art approach, while effective and adequate for many applications, requires the use of a relatively expensive stepper motor and its control circuits while nonetheless failing to control the flowrate to the precision and constancy desired for many applications.

Attention is now directed to the remainder of the system which employs the output signals from the NAND gates 20 and 22 to develop means for effecting the desired fine control over the flowrate of the fluid in the conduit 8. A pair of integrated circuit synchronous up/down four-bit binary counters, 32 and 34, are arranged in a cascade configuration to obtain an eight-bit up/down counter. The output from the NAND gate 20 is inverted through the inverter 26 and applied to a first input leg of a NAND gate 38 which drives the countup input of the up/down counter 32. Similarly, the output signals from the NAND gate 22 are inverted through an inverter 40 and applied to a first input of a NAND gate 42 which drives the count-down input of the up/down counter 32.

The data input terminals a, b, c, d, for each of the up/down counters 32, 34 are connected to first terminals of individual switches 44, 46, 48, 50, 52, 54, 55, 58, and the other terminals of each of these switches are connected together and to a reference potential source.

The load inputs to each of the up/down counters 32, 34 are driven by the output from an inverter 60 which itself is driven by the output from a NAND gate 62. A first input to the NAND gate 62 is connected to one terminal of a resistor 64 which has its other terminal connected to a positive voltage source at a potential which represents a logic 1 in the exemplary system. The other input to the NAND gate 62 is connected to one terminal of a parallel circuit comprising a resistor 66 and a capacitor 68. The other terminal of the parallel circuit is connected to a reference potential source representing a logic 0.

The outputs, $Q_a$, $Q_b$, $Q_c$, and $Q_d$, of each of the up/down counters 32 and 34 are connected to the eight inputs of an eight-bit digital-to-analog converter 80. In addition, each of the outputs from the up/down counters 32 and 34 except the lowest order ($Q_d$ of counter 32) are connected to individual inputs of a seven-input NAND gate 72. Each input signal to the NAND gate 72 is inverted through one of the array of seven inverters 74, 76, 78, 80, 82, 84, 86 and is applied to an individual input to another seven input NAND gate 88. The output from the NAND gate 72 is applied to a second input to the NAND gate 38, and the output from the NAND gate 88 is applied to a second input to the NAND gate 42.

The analog output from the digital-to-analog converter 70 is applied, through a span resistor 90, to the inverting input of a two-wire transmitter 92. The common reference from the digital-to-analog converter 70 is connected to the noninverting input of the two-wire transmitter 92. The two-wire transmitter 92 is a linear integrated circuit characterized by its ability to convert the voltage from a sensor or other signal source to a current and send it to a receiver utilizing the same twisted pair as the supply voltage. The use of the power supply leads as the signal output eliminates two or three extra wires in remote signal applications. Also, in industrial environments, the use of current output minimizes the susceptability to voltage noise spikes and eliminates a line drop problem.

Thus, one line of the output pair from the two wire transmitter 92 is connected directly to a +24 volt terminal of a power supply 94, and the other line is connected through a remote load 96 to the common side of the power supply 94. The remote load, in the present system, constitutes a device, such as a d-c torque motor, which drives a valve 98, disposed in the conduit 8, to a position which is dependent on the current passing through the motor device 96.

In operation, the switches 44, 46, 48, 50, 52, 54, 56 and 58, are set to a digital configuration (open equals logic 1; closed equals logic 0) representing the estimated correct position to which the valve 98 will regulate the flow of fluid through the conduit 8 to the desired flow rate. Upon application of power, the input to the NAND gate 62 which is connected to the resistor 64 assumes the logic 1 level; however, the other input to the NAND gate 62 remains initially below the threshold necessary to establish a logic 1 level to the NAND gate. The capacitor 68 begins to charge toward the 1 logic level through the internal circuitry of the NAND gate 62. Until the signal at this input reaches the logic 1 threshold, the signal issued by the NAND gate 62 is a logic which is inverted through the inverter 60 to maintain a logic 0 signal on the load inputs to the up/down counters 32 and 34. When the capacitor 68 charges sufficiently to pass the threshold representing a logic 1 input to the NAND gate 62, the signal issued by the NAND gate 62 switches abruptly to a logic 0 which is inverted to a logic 1 through the inverter 60, and the output signal from the inverter 60 is employed to cause data stored in the switches 44, 46, 48, 50, 52, 54, 56, 58 to be loaded into the up/down counters 32, 34. Initially, therefore, the digital/analog converter 70 receives from the up/down counters 32, 34, the digital representation of the estimated initial position for the valve 98 and converts this digital number to an analog voltage which is transferred to the two wire transmitter 92. The two wire transmitter 92 issues a corresponding current which drives the motor device 96 to place the valve 98 in the estimated position.

Thereafter, count up and count down pulses from the NAND gates 20 and 22, respectively, are applied, through the inverters 36 and 40 and the NAND gates 38 and 42 to the count-up and count-down inputs to the up/down counter 32. Any change in the total count observed in the eight-bit counter comprising the counters 32, 34 is sensed by the digital-to-analog converter 70 which responds by issuing a corresondingly altered analog output voltage to the two wire transmitter 92 which, in turn, responds by correspondingly adjusting the output current to the motor device 96 to effect the correction to the position of the valve 98.

The logic network comprising the NAND gates 72 and 78 and the inverters 74, 76, 78, 80, 82, 84, and 86 function as safety devices to prevent the counters 32, 34 from counting down below a total count of one or up above a total count of 254. It will be observed that all output bits from the counter 32, 34 except the lowest order bit, are individually connected to the NAND gate 74. Thus, the NAND gate 72 will be enabled when, and only when, the total count in the counters 32, 34 reaches 254. When this condition is reached, the output signal from the NAND gate 72 will switch from logic 1 to logic 0, thereby inhibiting the passage of further count-up pulses through the NAND gate 39. Similarly, should the total count in the counters 32, 34 reach one, the signals applied to the inputs of the inverters 74, 76, 78, 70, 82, 84, and 86 are all logic 0, and these signals are inverted to become logic 1 input signals to the NAND gate 88. The NAND gate 88 becomes enabled and issues a logic 0 level to disable the NAND gate 42 and prevent further count-down pulses from being applied to the count-down input to the counter 32 until at least one count-up pulse has been applied.

In a presently preferred embodiment of the invention, the logic is implemented in 7400 series TTL logic. Thus, the one-shot multivibrator 4 and 10 constitute a 7421 dual monostable multivibrator, and the flip-flop 18 is a 7472 JK master/slave flip-flop. The up/down counters 32, 34 may be 74193 synchronous up/down binary counters, the various two-input NAND gates may be elements of 74132 quad to two-input NAND gates, the NAND gates 72 and 78 may be 7430 eight-input NAND gates, and the various inverters may be elements of 7414 hex Schmidts. The digital-to-analog converter 70 may be a Datel model DAC9-8B1, and the two wire transmitter 92 may be a model LH-0045CK manufactured by National Semiconductor Corp.

While the principles of the invention have now been made clear in an illustrative embodiment, there will be immediately obvious to those skilled in the art many modifications of structure, arrangements, proportions, the elements, materials and components, used in the practice of the invention which are particularly adapted for specific environments and operating requirements without departing from those principles.

What is claimed is:

1. A system for maintaining the flowrate of a fluid through a conduit at a predetermined value, which system includes:
   (A) means for generating a first pulse stream having a frequency representative of the predetermined flowrate;
   (B) means for generating a second pulse stream having a frequency representative of the actual flowrate;
   (C) a valve disposed in the fluid stream for regulating the flowrate by adjusting the valve position;
   (D) motor means coupled to said valve for adjusting the valve position;
   (E) an up/down counter having count-up and count-down inputs and a plurality of outputs, which outputs provide a digital representation of the count held within said counter;
   (F) a digital-to-analog converter coupled to said counter to receive said counter outputs, said digital-to-analog converter being adapted to issue an analog signal representative of the count held within said counter;
   (G) motor drive means having an input coupled to receive said analog signal and an output coupled to drive said motor means;
   (H) pulse difference means coupled to receive said first and second pulse streams and adapted to apply an increment pulse to said count-up input to said up/down counter if the frequency of one of said pulse streams exceeds the frequency of the other pulse stream; and
   (I) safety means for inhibiting:
      1. the application of increment pulses to said count-up input of said up/down counter when the count therein reaches a first predetermined value, and
      2. the application of decrement pulses to said count down input of said up/down counter when the count therein reaches a second predetermined value.

2. The system of claim 1 in which said pulse difference means is further adapted to apply a decrement pulse to said count-down input to said up/down counter if the frequency of said one of said pulse streams is less than the frequency of said other pulse stream.

3. The system of claim 2 in which said one of said pulse streams is said first pulse stream and said other pulse stream is said second pulse stream.

4. The system of claim 1 which further includes preset means for entering a count into said counter independent of said count-up and count-down inputs.

5. The system of claim 4 which further includes initialization means for actuating said preset means upon initiation of system operation.

6. The system of claim 1 in which said motor drive means comprises a two-wire transmitter.

7. A system for maintaining the flowrate of a fluid through a conduit at a predetermined value, which system includes:
   (A) means for generating a first pulse stream having a frequency representative of the predetermined flowrate;
   (B) means for generating a second pulse stream having a frequency representative of the actual flowrate;
   (C) a valve disposed in the fluid stream for regulating the flowrate by adjusting the valve position;
   (D) motor means coupled to said valve for adjusting the valve position;
   (E) an up/down counter having count-up and count-down inputs and a plurality of outputs, which outputs provide a digital representation of the count held within said counter;
   (F) preset means for entering a count into said counter independent of said count-up and count-down inputs;
   (G) a digital-to-analog converter coupled to said counter to receive said counter outputs, said digital-to-analog converter being adapted to issue an analog signal representative of the count held within said counter;
   (H) motor drive means having an input coupled to receive said analog signal and an output coupled to drive said motor means; and
   (I) pulse difference means coupled to receive said first and second pulse streams and adapted to apply an increment pulse to said count-up input to said up/down counter if the frequency of one of said pulse streams exceeds the frequency of the other pulse stream.

8. The system of claim 7 which further includes initialization means for actuating said preset means upon initiation of system operations.

* * * * *